United States Patent
Sueyoshi

(10) Patent No.: US 10,408,629 B2
(45) Date of Patent: Sep. 10, 2019

(54) NAVIGATION SYSTEM, CLIENT TERMINAL DEVICE, CONTROL METHOD, AND STORAGE MEDIUM

(71) Applicant: SONY CORPORATION, Tokyo (JP)

(72) Inventor: Takahiko Sueyoshi, Tokyo (JP)

(73) Assignee: SONY CORPORATION, Tokyo (JP)

( * ) Notice: Subject to any disclaimer, the term of this patent is extended or adjusted under 35 U.S.C. 154(b) by 1 day.

(21) Appl. No.: 15/524,294

(22) PCT Filed: Oct. 19, 2015

(86) PCT No.: PCT/JP2015/079486
§ 371 (c)(1),
(2) Date: May 4, 2017

(87) PCT Pub. No.: WO2016/113968
PCT Pub. Date: Jul. 21, 2016

(65) Prior Publication Data
US 2017/0336217 A1    Nov. 23, 2017

(30) Foreign Application Priority Data

Jan. 14, 2015   (JP) ................. 2015-005059

(51) Int. Cl.
*G06K 9/00*  (2006.01)
*G01C 21/00*  (2006.01)
(Continued)

(52) U.S. Cl.
CPC ....... *G01C 21/3407* (2013.01); *G01C 21/005* (2013.01); *G01C 21/26* (2013.01);
(Continued)

(58) Field of Classification Search
CPC .......... G01C 21/347; G01C 21/005; G01C 21/3629; G06K 9/00302; G06Q 50/265
See application file for complete search history.

(56) References Cited

U.S. PATENT DOCUMENTS

2009/0177607 A1   7/2009  Matsushima
2010/0145695 A1   6/2010  Jung et al.
(Continued)

FOREIGN PATENT DOCUMENTS

JP    2005-46305 A    2/2005
JP    2009-288843 A   12/2009
(Continued)

OTHER PUBLICATIONS

International Search Report dated Nov. 10, 2015 in PCT/JP2015/079486 filed Oct. 19, 2015.
(Continued)

*Primary Examiner* — Aaron L Troost
(74) *Attorney, Agent, or Firm* — Oblon, McClelland, Maier & Neustadt, L.L.P.

(57) ABSTRACT

A navigation system includes an acquisition unit that acquires position information indicating a position of a client terminal device and information related to a feeling of a user of the client terminal device. The system includes a generation unit that generates a degree of security of the position indicated by the position information on a basis of the position information and the information related to the feeling of the user, to generate a feeling map. The system includes an estimation unit that estimates a location with a high degree of security on a basis of the feeling map. The system includes a guidance generation unit that generates guidance for guiding the user of the client terminal device to the location with the high degree of security. The system includes a provision unit that provides the guidance to the user of the client terminal device.

18 Claims, 11 Drawing Sheets

(51) Int. Cl.
  *G01C 21/26* (2006.01)
  *G01C 21/34* (2006.01)
  *G01C 21/36* (2006.01)
  *G06F 3/048* (2013.01)
  *G06Q 50/10* (2012.01)
  *G06Q 50/26* (2012.01)
  *G08B 27/00* (2006.01)

(52) U.S. Cl.
  CPC ......... *G01C 21/3629* (2013.01); *G06F 3/048* (2013.01); *G06K 9/00302* (2013.01); *G06Q 50/10* (2013.01); *G06Q 50/26* (2013.01); *G08B 27/00* (2013.01); *G06Q 50/265* (2013.01)

(56) References Cited

U.S. PATENT DOCUMENTS

| | | | |
|---|---|---|---|
| 2012/0150430 A1* | 6/2012 | French | G01C 21/3415 701/425 |
| 2014/0032114 A1* | 1/2014 | Titus | G01C 21/3453 701/537 |
| 2014/0191872 A1 | 7/2014 | Gomi et al. | |
| 2014/0250200 A1* | 9/2014 | Geurts | G06Q 50/01 709/206 |
| 2015/0049953 A1* | 2/2015 | Movellan | G06K 9/00302 382/197 |
| 2015/0112581 A1* | 4/2015 | Hakim | G01C 21/3461 701/400 |
| 2016/0282129 A1* | 9/2016 | Wang | H04W 4/02 |

FOREIGN PATENT DOCUMENTS

| | | |
|---|---|---|
| JP | 2010-4177 A | 1/2010 |
| JP | 2010-134937 A | 6/2010 |
| JP | 2011-210205 A | 10/2011 |
| JP | 2012-221480 A | 11/2012 |
| JP | 2013-25653 A | 2/2013 |
| JP | 2013-218477 A | 10/2013 |
| WO | 2006/080344 A1 | 8/2006 |
| WO | 2008/041424 A1 | 4/2008 |
| WO | WO 2011/007386 A1 | 1/2011 |

OTHER PUBLICATIONS

Extended European Search Report dated Jun. 13, 2018 in corresponding European Patent Application No. 15877920.7, 9 pages.

* cited by examiner

INTEGRATED HEAT MAP

NAVIGATION SYSTEM, CLIENT TERMINAL DEVICE, CONTROL METHOD, AND STORAGE MEDIUM

TECHNICAL FIELD

The present disclosure relates to a navigation system, a client terminal device, a control method, and a storage medium.

BACKGROUND ART

In recent years, in an emergency such as a disaster, transmission of a disaster alarm or disaster information, presentation of evacuation guidance for users, and the like have been performed with the development of communication technology.

Techniques disclosed in, for example, Patent Literatures 1 to 3 have been proposed with respect to the presentation of evacuation guidance for users. Specifically, Patent Literature 1 discloses a system that causes a sufferer to select waiting for rescue or evacuation on their own through a television screen or the like, and presents an evacuation route to a location with a high degree of safety to the sufferer and notifies the sufferer of a rescuer on the route to support activities of a private rescue team.

Further, Patent Literature 2 discloses a system in which voice information (road traffic information) indicating a traffic jam situation which is visually recognized by a driver is uploaded to a server and road traffic information is distributed through a corresponding area server, according to a request from a driver in each area, to perform voice guidance.

In addition, Patent Literature 3 discloses a system capable of moving a user along a guidance route through a head mounted display type guidance device that guides a user by recognizing a surrounding object, performing an adjustment so that the degree of temptation of the recognized object with respect to the user is strengthened in a case in which the recognized object is present in the guidance route, and performing an adjustment so that the degree of temptation is reduced in a case in which the object is not present in the guidance route.

CITATION LIST

Patent Literature

Patent Literature 1: JP 2013-25653A
Patent Literature 2: JP 2013-218477A
Patent Literature 3: WO2006/080344

DISCLOSURE OF INVENTION

Technical Problem

However, it is preferable that evacuation guidance in an emergency such as a disaster is information presentation and action induction in a hands-free situation, and a guidance method based on a smartphone, a tablet terminal, or the like in the related art has a problem that hands of a user are occupied. Further, in an emergency situation that needs a speedy solution, it is difficult to intuitively recognize which way to escape in with information presentation using a map application or the like. In addition, there is also a problem in that watching of a screen causes disconnection from an external environment and attention of a user becomes loose to cause a dangerous situation.

Further, in the evacuation guidance of the related-art, it is expected that people are guided to a closest evacuation location among places registered as evacuation locations by a local government in advance on the basis of a disaster danger place map or the like, but it is unknown what kind of feelings and states people who have already been evacuated to the evacuation location are currently in. Accordingly, even though the evacuation location to which people are guided is a safe location from a viewpoint of a disaster, there may be a case in which the evacuation location is a location in which the people who have been evacuated feel anxious due to some factors or a location in which quarrels and trouble between evacuees frequently occur. Such an evacuation location is not preferable as an evacuation guidance destination in consideration of a long-term stay.

Accordingly, the present disclosure discloses a navigation system, a client terminal device, a control method, and a storage medium capable of guiding people to a location with a high degree of security on the basis of information about feelings of people associated with the location.

Solution to Problem

According to the present disclosure, there is provided a navigation system including: an acquisition unit that acquires position information indicating a position of a client terminal device and information related to a feeling of a user of the client terminal device; a generation unit that generates a degree of security of the position indicated by the position information on a basis of the position information and the information related to the feeling of the user, to generate a feeling map; an estimation unit that estimates a location with a high degree of security on a basis of the feeling map; a guidance generation unit that generates guidance for guiding the user of the client terminal device to the location with the high degree of security; and a provision unit that provides the guidance to the user of the client terminal device.

According to the present disclosure, there is provided a client terminal device including: a position information detection unit that detects a position of the client terminal device and generates position information indicating the position; a detection unit that detects information related to a feeling of a user of the client terminal device; a transmission unit that transmits the position information and the information related to the feeling of the user to an external device; an acquisition unit that acquires a feeling map which is generated by the external device on a basis of the position information and the information related to the feeling of the user, and which indicates a degree of security of the position indicated by the position information; and an output unit that outputs, to the user of the client terminal device, guidance for guiding the user of the client terminal device to a location estimated to have a high degree of security on a basis of the feeling map.

According to the present disclosure, there is provided a control method including: acquiring position information indicating a position of a client terminal device and information related to a feeling of a user of the client terminal device; generating a degree of security of the position indicated by the position information on a basis of the position information and the information related to the feeling of the user, to generate a feeling map; estimating a location with a high degree of security on a basis of the feeling map; generating guidance for guiding the user of the client terminal device to the location with a high degree of security; and providing the guidance to the user of the client terminal device.

According to the present disclosure, there is provided a storage medium that stores a program for causing a computer to function as: a position information detection unit that detects a position of a client terminal device and generates position information indicating the position; a detection unit that detects information related to a feeling of a user of the client terminal device; a transmission unit that transmits the position information and the information related to the feeling of the user to an external device; an acquisition unit that acquires a feeling map which is generated by the external device on a basis of the position information and the information related to the feeling of the user, and which indicates a degree of security of the position indicated by the position information; and an output unit that outputs, to the user of the client terminal device, guidance for guiding the user of the client terminal device to a location estimated to have a high degree of security on a basis of the feeling map.

Advantageous Effects of Invention

According to the present disclosure as described above, it is possible to guide people to a location with a high degree of security on the basis of information about feelings of people associated with the location.

Note that the effects described above are not necessarily limitative. With or in the place of the above effects, there may be achieved any one of the effects described in this specification or other effects that may be grasped from this specification.

Figure 1:
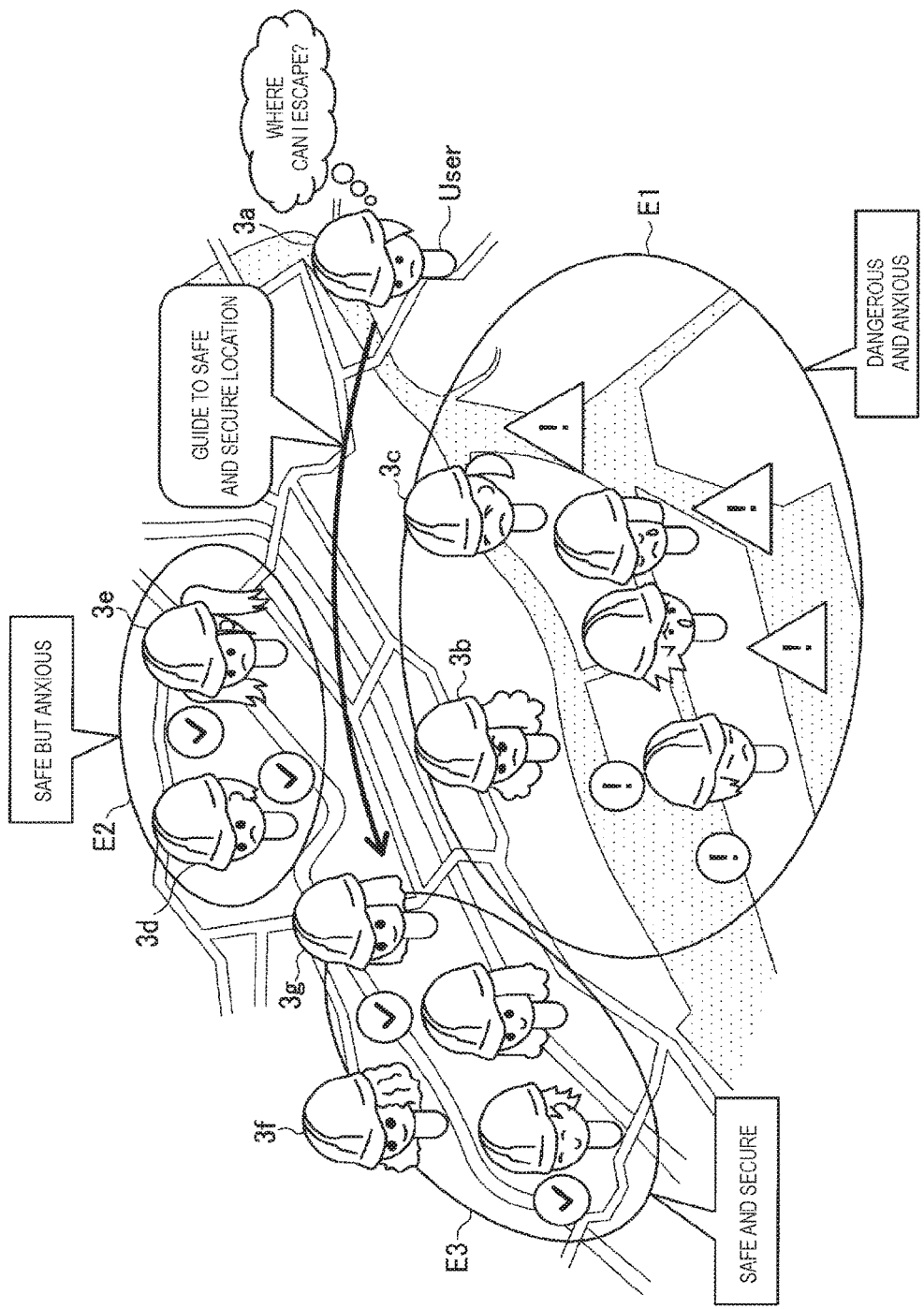
FIG. 1 is a diagram showing an overview of a navigation system according to an embodiment of the present disclosure.

Hereinafter, (a) preferred embodiment(s) of the present disclosure will be described in detail with reference to the appended drawings. In this specification and appended drawings, structural elements that have substantially the same function and structure are denoted with the same reference numerals, and repeated explanation of these structural elements is omitted.

MODE(S) FOR CARRYING OUT THE INVENTION

Further, the description will be provided in the following order.
1. Overview of navigation system according to embodiment of the present disclosure
2. Basic configuration
2-1. Evacuation guidance server
2-2. Sensitivity server
2-3. Client terminal
3. Operation process
4. Application example
5. Conclusion 1. OVERVIEW OF NAVIGATION SYSTEM ACCORDING TO EMBODIMENT OF THE PRESENT DISCLOSURE First, an overview of a navigation system according to an embodiment of the present disclosure will be described with reference to FIG. 1. As shown in FIG. 1, the navigation system according to the embodiment guides a user to a safe and secure location using a head-hack wearable device (HHWD) 3 in an emergency such as occurrence of a disaster. The HHWD 3 is mounted on a disaster prevention helmet that is expected to be worn by a user during evacuation, for example, and is able to intuitively transmit an evacuation instruction to the user through a bone conduction speaker or vibration to the head of the user.

The navigation system according to this embodiment guides a user to a safe location calculated on the basis of an environment heat map indicating dangerous places according to disaster categories, which is also a secure location calculated on the basis of a feeling heat map indicating current feelings of people who are in respective areas, using an HHMD 3a. The feelings of the people who are in the respective areas are acquired from biological information, facial expressions, or the like acquired by HHMDs 3b to 3g.

For example, in the example shown in FIG. 1, the navigation system recognizes that an area E1 is a location in which the degree of danger due to a disaster is high and the degree of anxiety of each person is also high, an area E2 is a location in which the degree of danger due to the disaster is low but the degree of anxiety of each person is high, and an area 3 is a location in which the degree of danger due to the disaster is low and the degree of security is high. In the related-art navigation system, a user is expected to be guided to the area E2 or E3 in which the degree of danger due to the disaster is low, but in the navigation system according to this embodiment, it is possible to preferentially guide users to the area E3 in which the degree of security is high using information about feelings of users associated with locations.

Figure 2:
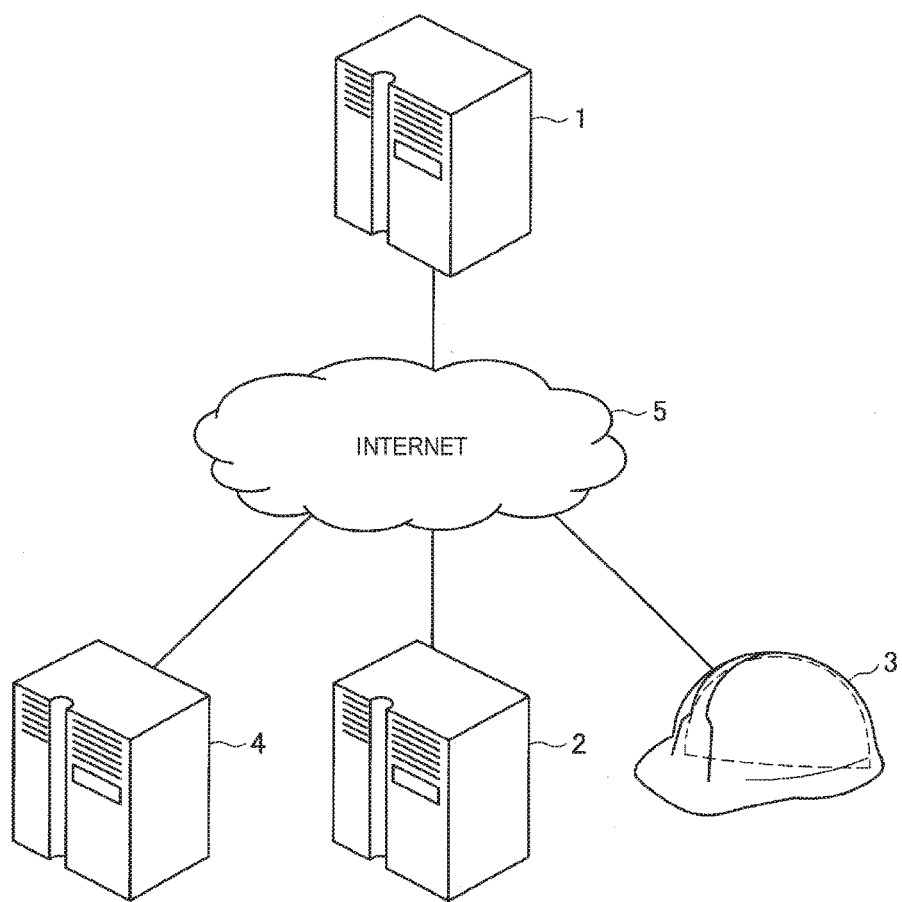
FIG. 2 is a diagram showing an overall configuration of the navigation system according to the embodiment.

The overview of the navigation system according to one embodiment of the present disclosure has been described above. Subsequently, an overall configuration of the navigation system according to this embodiment will be described. FIG. 2 is a diagram showing the overall configuration of the navigation system according to this embodiment. As shown in FIG. 2, the navigation system according to this embodiment includes an evacuation guidance server 1, a sensitivity server 2, the HHMD 3, and a heat map server 4. These components are, for example, connected to each other through the Internet 5.

The evacuation guidance server 1 communicates with the HHMD 3 through an access point or the like, and performs evacuation guidance to a safe and secure location with respect to a user through the HHMD 3. In FIG. 2, one HHMD 3 having a common configuration is shown, but the evacuation guidance server 1 is connected to multiple HHMDs 3a to 3g (see FIG. 1) mounted on disaster prevention helmets worn by multiple users in a disaster, and acquires biological information serving as a feeling information factor, a facial-expression-capturing image, and current position information.

Further, the evacuation guidance server 1 estimates a safe and secure location using an environment heat map indicating dangerous places according to disaster categories acquired from the heat map server 4 and a feeling heat map indicating information about feelings of people associated with locations, and guides the user to the estimated location. The environment heat map may be acquired from the heat map server 4, or may be generated by the evacuation guidance server 1. In addition, the feeling information of the people associated with the locations can be acquired from the biological information or facial-expression-capturing images of the respective users that are received from the multiple HHMDs 3a to 3g. Furthermore, the evacuation guidance server 1 according to this embodiment may acquire sensitivity values of people who are in evacuation locations as feeling information factors from the sensitivity server 2. The sensitivity server 2 accumulates "sensitivity values" which are specific indexes indicating the kinds of people. The "sensitivity values" are obtained by digitizing feelings with respect to things or people, which are calculated on the basis of evaluation values of interactions (that is, behaviors) between a plurality of objects including people or things. For example, a person who roughly handles things is calculated as a person with a low sensitivity value and is determined as a rough person. Further, in a case of a person with a high sensitivity value, the person is determined as a person who is credible. Accordingly, the evacuation guidance server 1 acquires sensitivity values of people who are in an area in question from the sensitivity server 2 when estimating a secure location, and may use the acquired sensitivity values when estimating a location with a high degree of security.

The overall configuration of the navigation system according to this embodiment has been described above. Subsequently, a basic configuration of each device included in the navigation system of this embodiment will be specifically described.

2. BASIC CONFIGURATION

<2-1. Evacuation Guidance Server>

Figure 3:
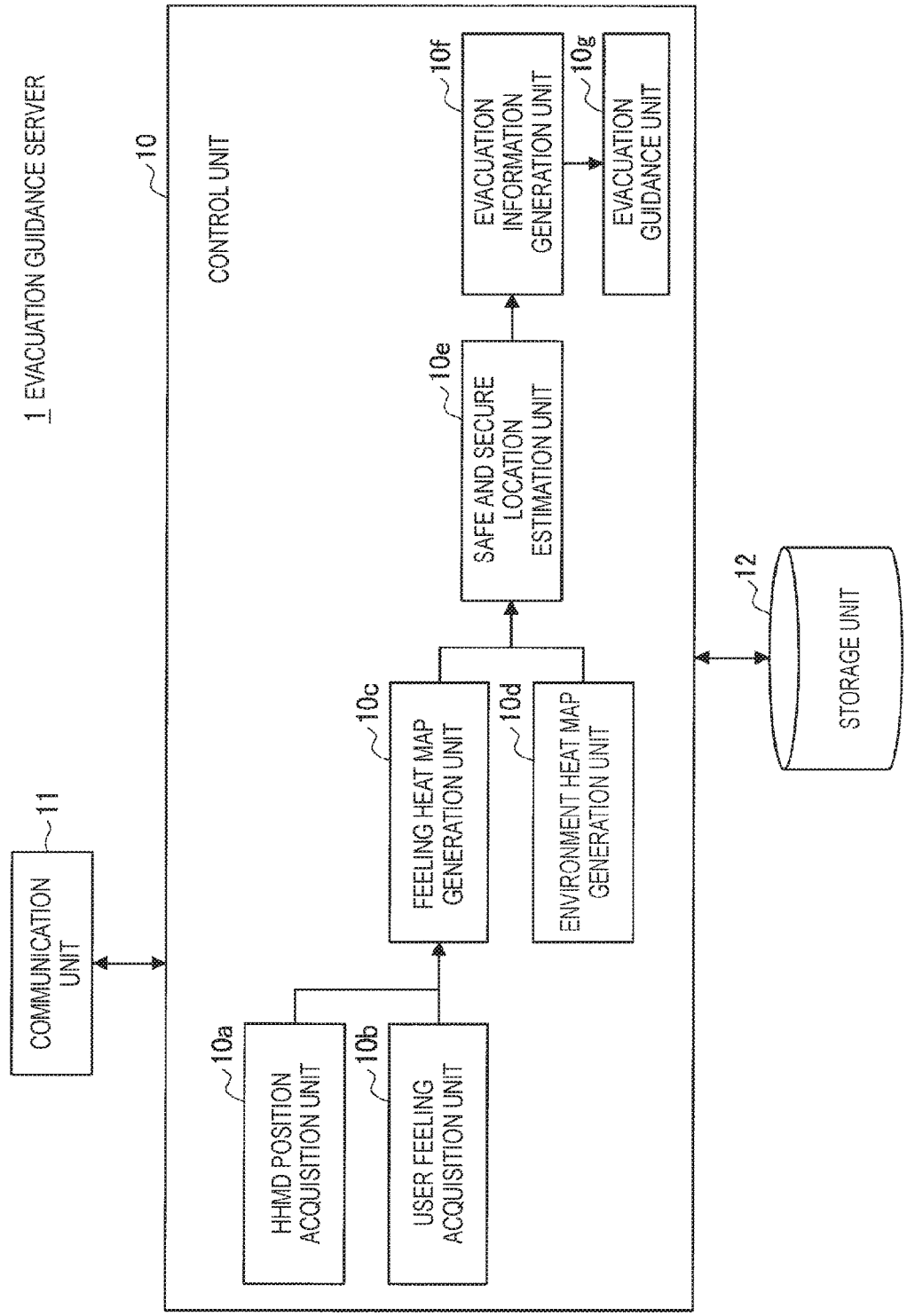
FIG. 3 is a block diagram showing an example of a configuration of an evacuation guidance server according to the embodiment.

FIG. 3 is a block diagram showing an example of a configuration of the evacuation guidance server 1 according to this embodiment. As shown in FIG. 3, the evacuation guidance server 1 includes a control unit 10, a communication unit 11, and a storage unit 12.

(Communication Unit)

The control unit 10 controls each component of the evacuation guidance server 1. The control unit 10 is realized by a microcomputer including a central processing unit (CPU), a read only memory (ROM), a random access memory (RAM), and a nonvolatile memory. Further, the control unit 10 according to this embodiment also functions as an HHMD position acquisition unit 10a, a user feeling acquisition unit 10b, a feeling heat map generation unit 10c, an environment heat map generation unit 10d, a safe and secure location estimation unit 10e, an evacuation information generation unit 10f, and an evacuation guidance unit 10g, as shown in FIG. 3.

The HHMD position acquisition unit 10a acquires current position information of a plurality of HHMDs 3. The current position information of the HHMDs 3 is, for example, transmitted from the HHMDs 3 and received by the communication unit 1. The HHMD position acquisition unit 10a outputs the acquired current position information of the HHMDs 3 to the feeling heat map generation unit 10c.

The user feeling acquisition unit 10b acquires information relating to a feeling of a user who wears each HHMD 3. The user feeling information may include biosensor information, facial expression information, and an amount of activity transmitted from the HHMD 3, and may also include, for example, social networking service (SNS) information or a sensitivity value. Specifically, for example, the biosensor information is brain waves, a heart rate, a body temperature, a blood glucose level, or the like acquired by a biosensor 33 provided in the HHMD 3 (see FIG. 10). Further, the facial expression information is a facial expression recognition result such as the degree of smiling, the degree of anxiety, or the degree of anger recognized from a user face image captured by a camera, which is an example of an environmental information sensor 34 provided in the HHMD 3, a mimetic muscle potential, or the like. Further, the activity amount is the quantity of user motion detected by an acceleration, a geomagnetic sensor, a gyro-sensor, or the like, which is an example of the environmental information sensor 34 provided in the HHMD 3, or the amount of user utterance collected by a microphone 37. In addition, the SNS information is information capable of being acquired from information on a network such as an SNS, and for example, may include the degree of intimacy between a user who performs evacuation guidance and people in an evacuation candidate area. The degree of intimacy may be calculated from whether or not there is a friend relationship on a SNS, the number of times of interest of the user expressed on the SNS, the percentage of favorable utterances based on results of language analysis of mutual utterances, or the like. Furthermore, the SNS information may also include a content analysis result of text messages based on writing using a message tool, e-mail, or the like, and may also include real-time information thereof since the message tool is used when a user who encounters a disaster sends a comment about a situation, anxiety, or tension of the user, or notifies the family or friends of the user that the user is in a secure location and is relieved, it is possible to acquire user feelings in real time. Further, the sensitivity values are acquired from the sensitivity server 2. For example, the user feeling acquisition unit 10b may calculate a total amount of sensitivity values of people in an evacuation candidate area. Thus, not only is a temporary feeling (the degree of security) used as a judgment material, but what kind of people are evacuated to a location in question is also recognized in advance, and thus, an evacuation candidate area is effectively selected.

Figure 5:
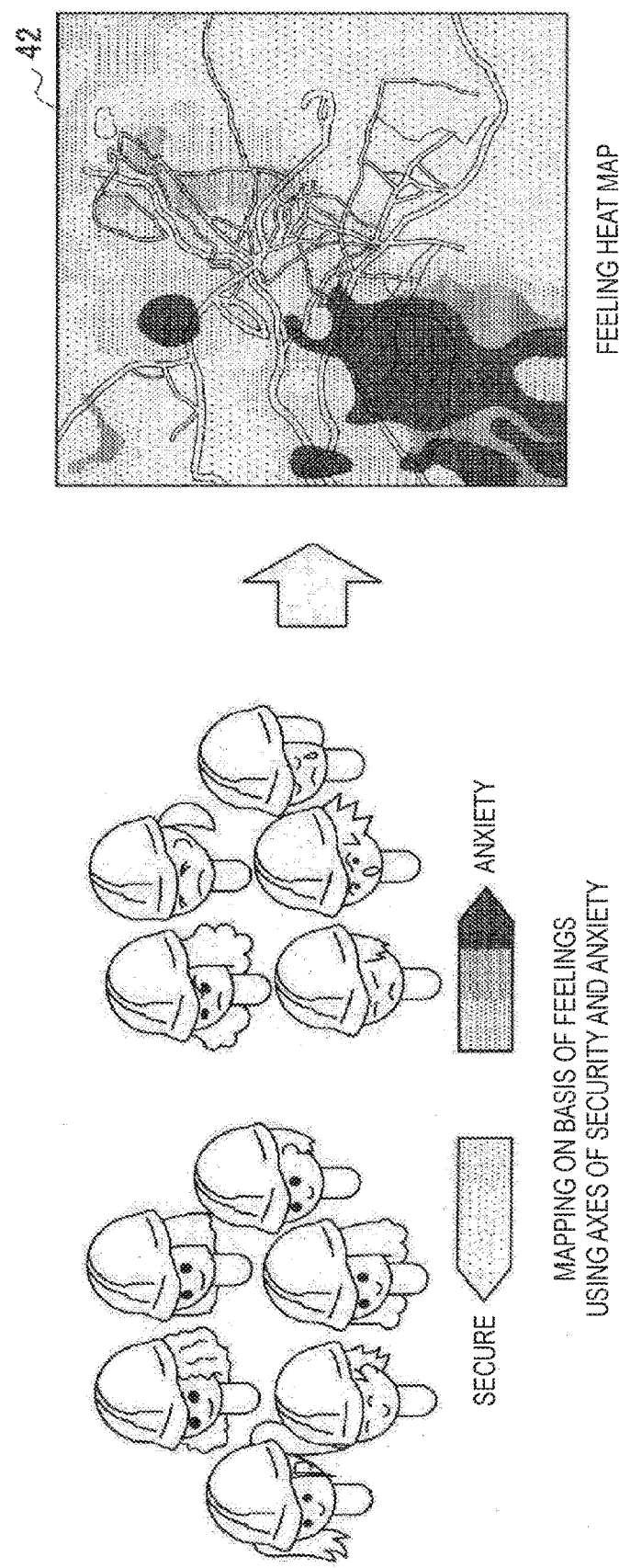
FIG. 5 is a diagram showing an example of a feeling heat map according to the embodiment.
Figure 6:
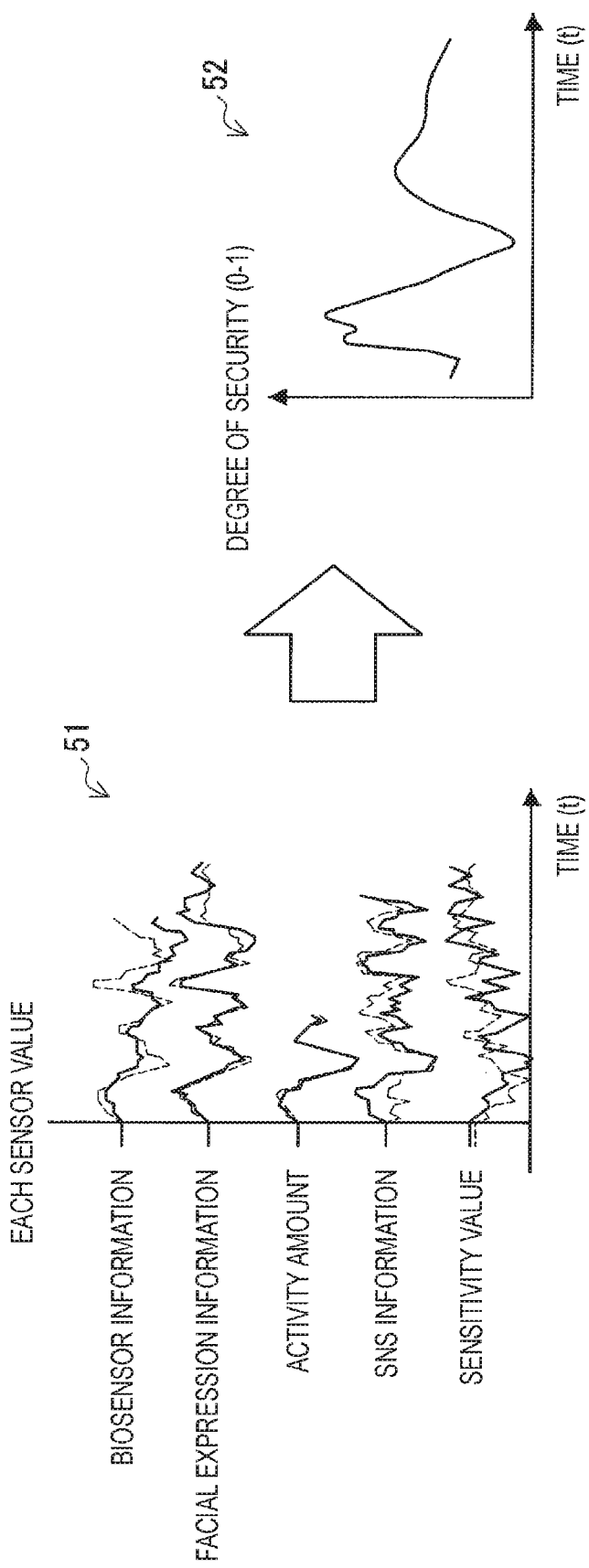
FIG. 6 is a diagram showing calculation of the degree of security of an evacuation candidate area according to the embodiment.

The feeling heat map generation unit 10c generates a map in which user feelings are mapped in association with user locations. Here, FIG. 5 shows an example of a feeling heat map 42. As shown in FIG. 5, the feeling heat map generation unit 10c may map user feelings mapped in association with locations using axes of security and anxiety to generate the feeling heat map 42 indicating a distribution of security and anxiety. Here, the user feelings may be determined from various factors as described above. Thus, the feeling heat map generation unit 10*c* may calculate the degree of security of an entire evacuation candidate area using a plurality of types of user feeling information factors of multiple users acquired by the user feeling acquisition unit 10*b*. Further, a case in which user feelings in the evacuation candidate area are changed over time may also be considered. FIG. 6 is a diagram illustrating a calculation of the degree of security of an evacuation candidate area. A graph 51 of sensor values shown on the left side in FIG. 6 is the graph 51 indicating an example of temporal changes of each piece of information indicating user feeling information factors of people present in an evacuation candidate area. In this embodiment, biosensor information, facial expression information, and activity amount are acquired in real time, and are considered to be changed over time. On the other hand, SNS information and sensitivity values are user feeling information factors capable of being calculated and acquired later on the basis of accumulated information, and it is difficult to consider a large temporal change, but the user feeling information factors may be referenced as a factor when the degree of security in the evacuation candidate area is calculated. Thus, the temporal changes of feelings according to an entrance and exit of people present in the evacuation candidate area are recognized. Further, the feeling heat map generation unit 10*c* calculates a graph 52 of the degree of security as shown on the right side of FIG. 6 on the basis of the graph 51. In addition, as a specific method of calculating the degree of security or the degree of anxiety, the feeling heat map generation unit 10*c* may consider a method of defining or learning in advance an evaluation function and a model function using the user feeling information factors that change over time to perform the calculation. Furthermore, a method of generating a rule table such as a table of scores used for a measure of "the degree of security or the degree of anxiety" in advance and calculating the degree of security or the degree of anxiety in the evacuation candidate area using the rule table may also be considered. For example, a table of scores based on whether biological information such as a "heart rate" or a "body temperature" is an appropriate value, or a total amount of positive feelings such as a smile, a rapid variation in each sensor measurement value, a time complexity that exceeds an abnormal value, or the like, is used.

Figure 7:
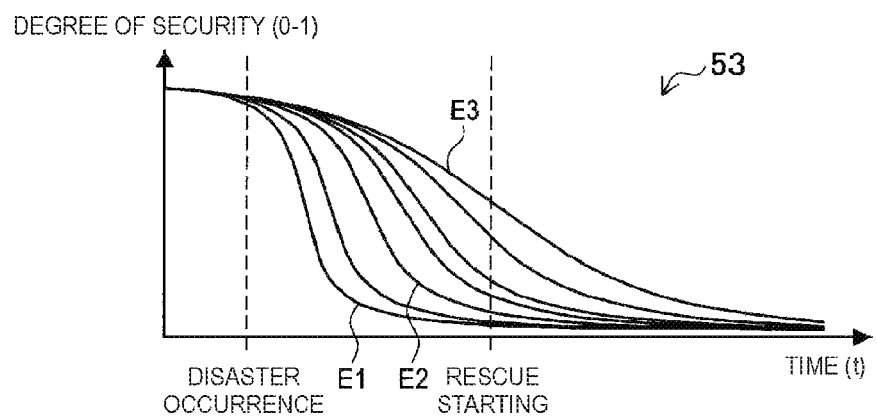
FIG. 7 is a diagram showing an example of a graph for predicting a temporal change of the degree of security according to the embodiment.

Further, when a disaster occurs, since a rescue activity is preferentially performed at an urgent site, organized rescue activities for evacuees are expected to be performed after several days elapse. Thus, people need to independently evacuate themselves during that period of time, and a life of an evacuee may be expected to be prolonged. Accordingly, even in a case of an evacuation candidate area with a temporarily high degree of security, as time elapses after the occurrence of a disaster, there may be a growing degree of anxiety (trouble between evacuees, occurrence of crime, anxiety due to no evacuation supplies, or the like). Accordingly, the feeling heat map generation unit 10*c* may generate a feeling heat map obtained based on a prediction of an evacuation candidate area in which the degree of security is maintained for a long time, as well as a feeling heat map indicating a distribution of a temporary degree of security or a temporary degree of anxiety at a certain point in time. For example, as shown in FIG. 7, an area in which a level of the degree of security is maintained for a long time from the occurrence of a disaster until the start of an organized rescue may be determined as an area with a high degree of security as a whole on the basis of a graph 53 obtained by predicting temporal changes of degrees of security in areas E1, E2, E3, and the like to generate a feeling heat map indicating a distribution of the degree of security. Since it is assumed that a moral behavior is highly likely to collectively occur in a group with high sensitivity values or high SNS information (the degree of intimacy) and the degree of attenuation thereof over time is low, such a group may be given a weight as a factor capable of maintaining the degree of security for a long time, which can be used to calculate an evacuation candidate area in which the degree of security is maintained for a long time.

As described above, in a generation of a feeling heat map indicating a distribution of the degree of security or the degree of anxiety, a map indicating a distribution of the degree of security at a certain time may be generated, or a map indicating a distribution of an area in which the degree of security is maintained for a long time in consideration of a temporal change may be generated. Further, the feeling heat map generation unit 10*c* may simulate a change of the degree of security or the degree of anxiety in a case in which a user who is a guidance target is actually added to the evacuation candidate area, to thereby generate a map indicating a distribution of the degree of security.

The environment heat map generation unit 10*d* generates a heat map indicating a distribution of the degree of safety according to a category of a disaster. The environment heat map generation unit 10*d* may acquire the heat map from the heat map server 4. The heat map according to the category of the disaster shows the degree of danger according to the category of the disaster, for example, the degree of danger related to flooding or sediment collapse in a case of a disaster due to rain. This is because dangerous locations or evacuation methods are also changed according to expected disasters (a tsunami, an earthquake directly under the capital, torrential rain, snow damage, or the like). Further, the environment heat map generated by the environment heat map generation unit 10*d* may be stored in the storage unit 12 of the evacuation guidance server 1, or may be stored in the heat map server 4. In addition, the environment heat map generation unit 10*d* may regularly update the environment heat map to be a latest environment heat map.

Figure 4:
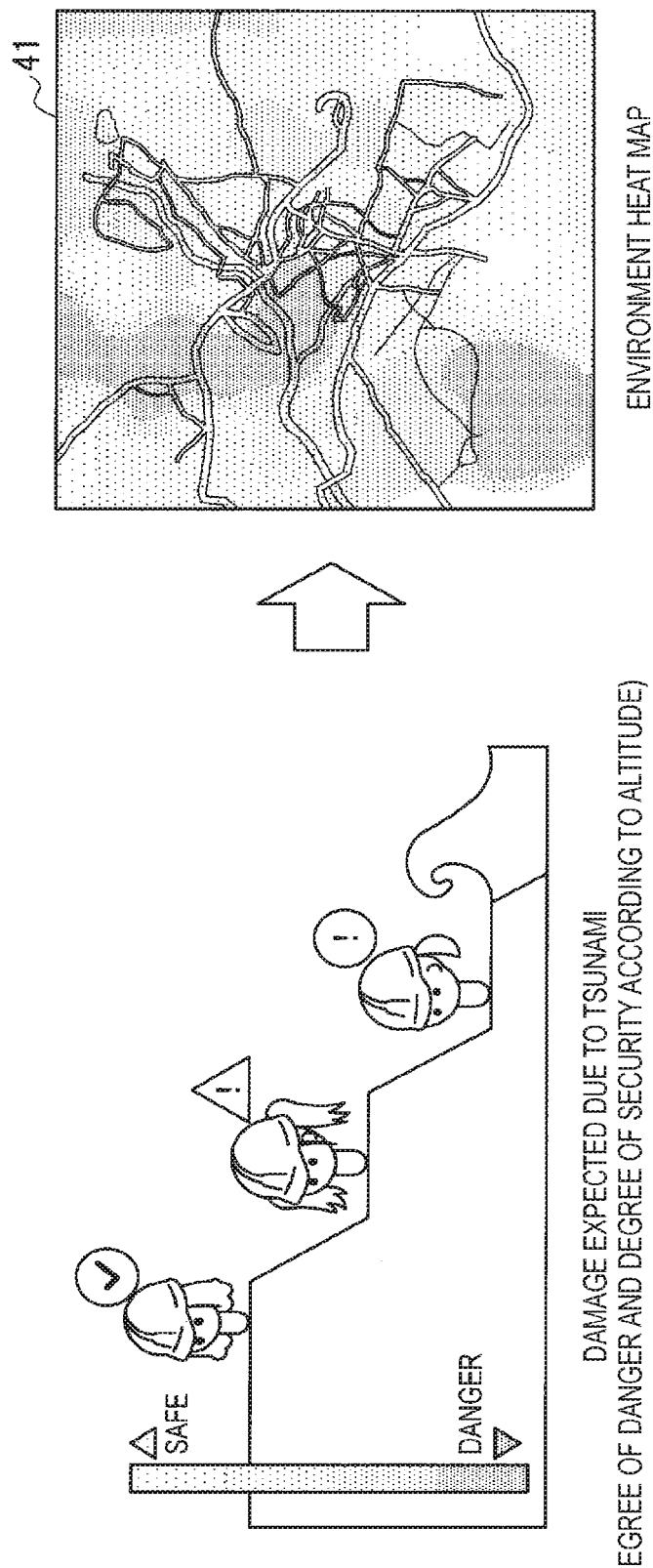
FIG. 4 is a diagram specifically illustrating a generation of an environment heat map according to the embodiment.

Here, FIG. 4 shows a diagram specifically illustrating a generation of an environment heat map. As shown in FIG. 4, for example, in an example of tsunami-induced damages caused by a large earthquake, a simulation is performed on the basis of terrain and building data, and for example, the degree of danger or the degree of security is determined according to altitudes to generate an environment heat map 41. Furthermore, the generation of the environment heat map 41 may be performed using open data coming from the Ministry of Land, Infrastructure and Transport and Tourism, a local government, or the like. Further, the environment heat map 41, which is manually generated from experiences of experts, may be stored in the heat map server 4.

Figure 8:
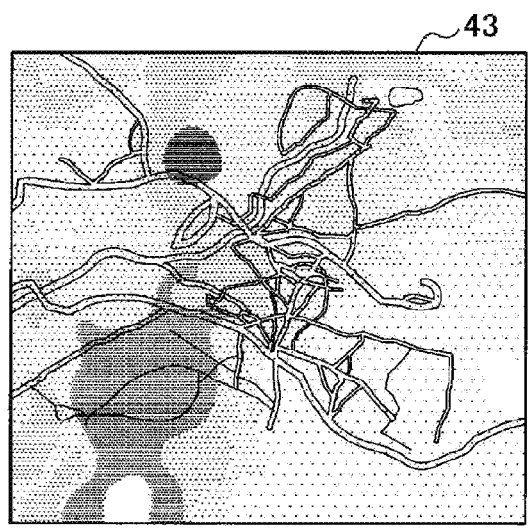
FIG. 8 is a diagram showing an example of an integrated heat map according to the embodiment.

The safe and secure location estimation unit 10*e* estimates a safe and secure location on the basis of the environment heat map 41 and the feeling heat map 42. Specifically, the safe and secure location estimation unit 10*e* estimates a safe and secure location using, for example, an integrated heat map obtained by integrating the environment heat map 41 and the feeling heat map 42. Here, FIG. 8 shows an example of an integrated heat map 43 according to this embodiment. It is possible to generate an integrate heat map in which the environment heat map 41 or the feeling heat map 42 is focused on by giving a weight to one of the heat maps when integrating the environment heat map 41 and the feeling heat map 42. The integrated heat map 43 shown in FIG. 8 serves as information for generally determining an "optimal evacuation location for a user". The safe and secure location estimation unit 10e estimates an evacuation location with a high degree of safety and a high degree of security on the basis of the integrated heat map 43, and outputs the estimation result to the evacuation information generation unit 10f. Further, the integrated heat map 43 is updated according to the updating of the environment heat map 41 or the feeling heat map 42. Particularly, since a rise and fall of the user feeling is severe in a disaster situation, it is preferable that the feeling heat map 42 is continuously updated.

The evacuation information generation unit 10f functions as a guidance generation unit that generates guidance for guiding a user who wears the HHMD 3 to a safe and secure location estimated by the safe and secure location estimation unit 10e. Specifically, the evacuation information generation unit 10f selects a route from a current location of the user to an evacuation location, and generates information for intuitively guiding the user. Further, if the user's current location is within a normal user's behavior action, the user can easily recognize a surrounding road or a location of a building which serves as a landmark, but in a case of an unfamiliar land, for example, during a business trip or sightseeing, guidance of such an intuitive evacuation route is effective.

The evacuation guidance unit 10g functions as a provision unit that provides guidance generated by the evacuation information generation unit 10f to a user through the HHMD 3. As described above, the HHMD 3 is, for example, a head-hack wearable device mounted on a disaster prevention helmet, and is able to intuitively show an evacuation route to a user by voice output ("please walk straight", "please turn right", or the like) or vibration output (vibration of a portion in an advancing direction when seen from the user or the like). Since the user does not need to watch an image during evacuation, the user can be safely evacuated in accordance with the voice or the like while maintaining his or her attention on the surroundings without being disconnected from an external environment.

(Communication Unit)

The communication unit 11 performs transmission and reception of data with an external device. For example, the communication unit 11 is connected to the HHMD 3 to receive biosensor information, facial expression information, and current position information, or is connected to the sensitivity server 2 to receive a sensitivity value of a user. Further, the communication unit 11 transmits evacuation Guidance for a user to the HHMD 3 under control of the evacuation guidance unit 10g.

(Storage Unit)

The storage unit 12 stores, for example, a program for executing each of the processes in the control unit 10. Further, the storage unit 12 may store the environment heat map 41, the feeling heat map 42, the integrated heat map 43, current position information of the HHMD 3, or the like.

<2-2. Sensitivity Server>

Figure 9:
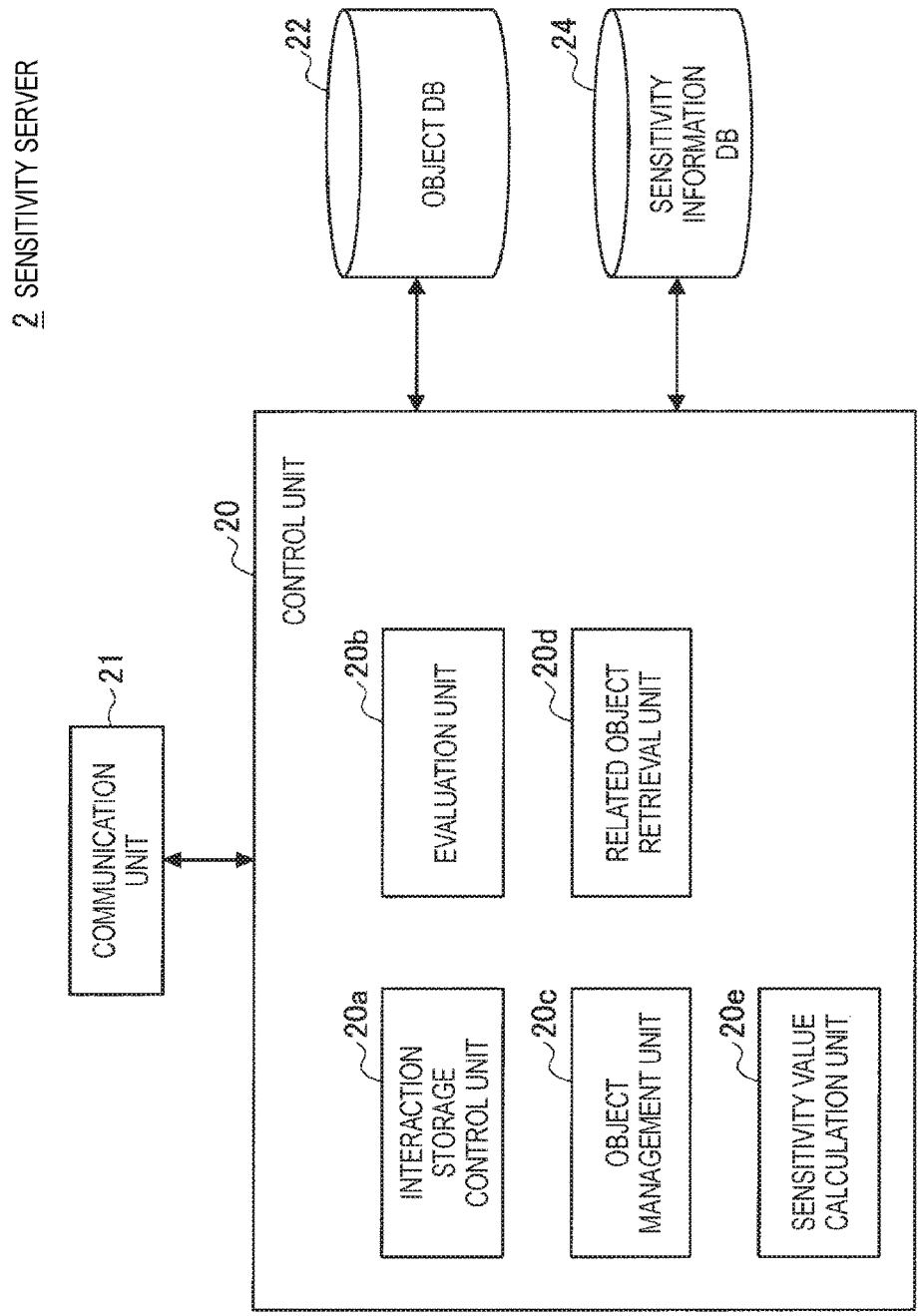
FIG. 9 is a block diagram showing an example of a configuration of a sensitivity server according to the embodiment.

Then, a configuration of the sensitivity server 2 according to this embodiment will be described. FIG. 9 is a block diagram showing an example of the configuration of the sensitivity server 2 according to this embodiment. As shown in FIG. 9, the sensitivity server 2 includes a control unit 20, a communication unit 21, an object DB 22, and a sensitivity information DB 24.

(Communication Unit)

The communication unit 21 is connected to the evacuation guidance server 1 through a network, and returns a reply of a sensitivity value associated with an object ID of a target user designated by the evacuation guidance server 1. Further, the communication unit 21 receives interaction information from a sensing device (not shown) attached to or mounted on each object (a person or a thing).

(Control Unit)

The control unit 20 controls each of components of the sensitivity server 2. Further, the control unit 20 is realized by a microcomputer including a CPU, a ROM, a RAM, and a non-volatile memory. In addition, the control unit 20 according to this embodiment functions as an interaction storage control unit 20a, an evaluation unit 20b, an object management unit 20c, an associated object retrieval unit 20d, and a sensitivity value calculation unit 20e.

The interaction storage control unit 20a performs control for storing interaction information received from the sensing device attached to or mounted in the object in the sensitivity information DB 24. The sensing device is realized by a moisture sensor, a temperature sensor, a vibration sensor, an infrared sensor, a camera, a tactile sensor, a gyro sensor, or the like, and detects an interaction with respect to the object from another object. The interaction refers to an action, and for example, may be a conversation, a telephone call, an e-mail, a gift of a present, or the like between people. Further, the interaction may be caring, storing, cleaning, appreciating, wearing of things, or the like between a person and a thing.

The evaluation unit 20b evaluates an interaction stored in the sensitivity information DB 24. A method for evaluating an interaction is not particularly limited, and for example, the evaluation unit 20b highly evaluates an interaction which is preferable for an object receiving the interaction, and specifically, gives points of −1.0 to 1.0. An evaluation result is stored in the sensitivity information DB 24 in association with the interaction.

The object management unit 20c performs management such as registration, change, deletion, or the like of information relating to an object stored in the object DB 22.

The associated object retrieval unit 20d retrieves another object on which an interaction has occurred with a required object ID as an associated object from the object DB 22 or the sensitivity information DB 24.

The sensitivity value calculation unit 20e calculates a sensitivity value (a feeling with respect to another object) of a target user on the basis of an interaction evaluation associated with an object ID of the target user. For example, the sensitivity value calculation unit 20e may calculate a total sensitivity value of the target user on the basis of a total of interaction evaluation values, or may calculate the total sensitivity value of the target user on the basis of an average value of the interaction evaluation values.

(Object DB)

The object DB 22 is a storage unit that stores an object ID of each object. Further, in the object DB 22, a variety of information relating to objects such as names, genders, product names, product types, maker IDs, model numbers, or manufacturing dates and times are stored, in addition to the object ID.

(Sensitivity Information DB)

The sensitivity information DB 24 is a storage unit that stores an interaction between objects or an evaluation of the interaction.

<2-3. HHMD>

Figure 10:
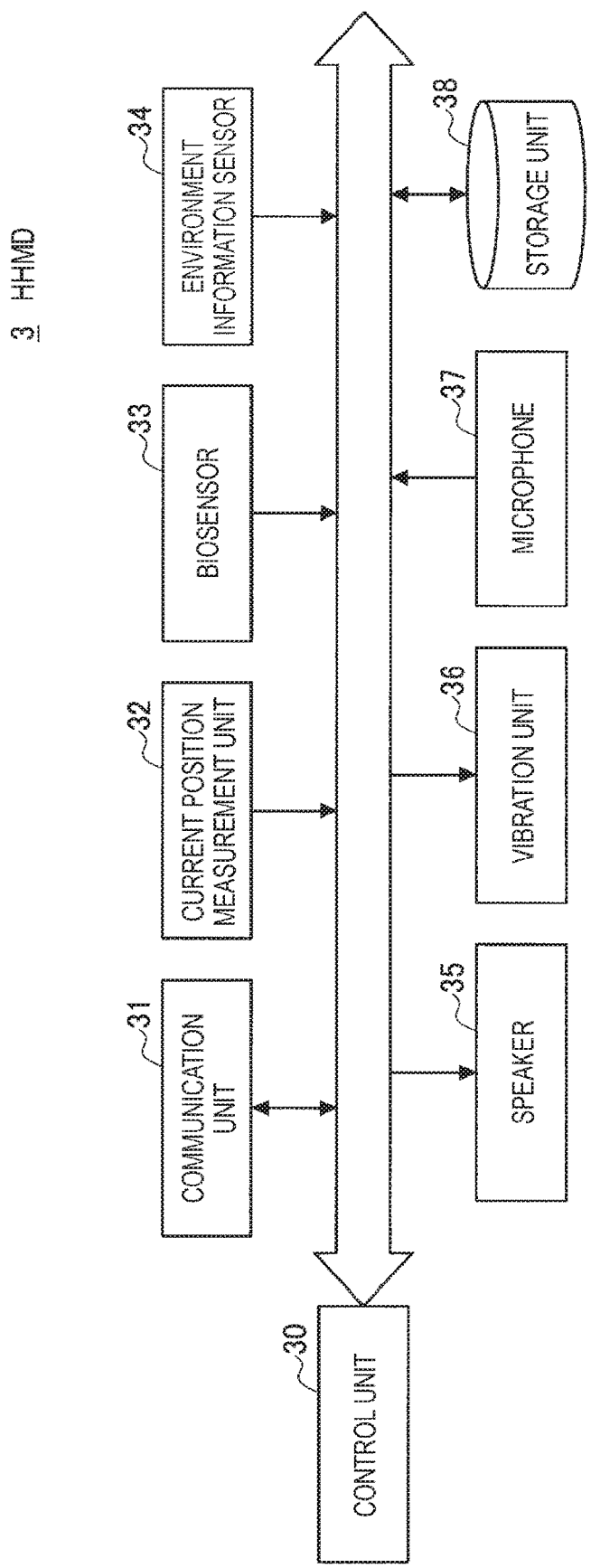
FIG. 10 is a block diagram showing an example of a configuration of an HHMD according to the embodiment.

Next, a configuration of the HHMD 3 which is an example of a client terminal according to this embodiment will be described with reference to FIG. 10. FIG. 10 is a block diagram showing an example of a configuration of the HHMD 3 according to this embodiment. As shown in FIG. 10, the HHMD 3 includes a control unit 30, a communication unit 31, a current position measurement unit 32, a biosensor 33, an environment information sensor 34, a speaker 35, a vibration unit 36, a microphone 37, and a storage unit 38.

(Control Unit 30)

The control unit 30 is configured by, for example, a microcomputer including a CPU, a ROM, a RAM, a non-volatile memory, and an interface unit, and controls each component of the HHMD 3. In addition, the control unit 20 performs control for performing voice output for evacuation guidance through the speaker 35 or performs control for performing vibration output for evacuation guidance through the vibration unit 36 on the basis of an evacuation guidance instruction signal received from the evacuation guidance server 1.

(Communication Unit 31)

The communication unit 31 is connected to an external device in a wireless or wired manner and has a function of performing a transmission and reception of data. The communication unit 31 according to this embodiment is connected to, for example, the evacuation guidance server 1 and continuously transmits biosensor information of a user detected by the biosensor 33 or current position information of the HHMD 3 measured by the current position measurement unit 32. Further, the communication unit 31 receives the evacuation guidance instruction signal from the evacuation guidance server 1.

(Current Position Measurement Unit 32)

The current position measurement unit 32 has a function of detecting a current position of the HHMD 3 on the basis of an external acquisition signal. Specifically, for example, the current position measurement unit 32 is realized by a global positioning system (GPS) measurement unit, receives radio waves from a GPS satellite, detects a position at which the HHMD 3 exists, and outputs information about the detected position to the control unit 30. Further, the current position measurement unit 32 may detect the position through a transmission and reception of a signal through Wi-Fi (registered trademark), Bluetooth (registered trademark), mobile phones, PHS, or smartphones, for example, or through near field communication or the like, in addition to GPS.

(Biosensor 33)

The biosensor 33 has a function of detecting biological information about the user who wears the HHMD 3. Since the HHMD 3 according to this embodiment is mounted on a head part of the user as described above, a body temperature sensor, a sweat rate sensor, a heart rate sensor, a brain wave detection sensor, or the like, which is an example of the biosensor 33, is provided at a location that is in contact with the user's skin at a time of wearing. The above-described plurality of types of sensors may be provided as biosensors 33 at a plurality of locations.

(Environment Information Sensor 34)

The environment information sensor 34 has a function of detecting information related to a peripheral environment including a user. The environment information sensor 34 according to this embodiment is realized by a moisture sensor, a temperature sensor, or an air quality sensor. Further, the environment information sensor 34 may be realized by, for example, a triaxial acceleration sensor, a gyro sensor, a geomagnetic sensor, or the like that detects a motion of the user who wears the HHMD 3. In addition, the environment information sensor 34 may be realized by an infrared camera for acquiring information about an object that exists in the vicinity of the user, or a camera for acquiring facial expression information of the user. The above-described plurality of types of sensors may be provided as environment information sensor 34 at a plurality of locations.

(Speaker 35)

The speaker 35 has a voice output function, and specifically, is realized by a bone conduction speaker. Further, a plurality of speakers 35 may be provided in the HHMD 3.

(Vibration Unit 36)

The vibration unit 36 has a vibration function. Further, a plurality of vibration units 36 may be provided in the HHMD 3, for example. Thus, the vibration unit 36 corresponding to an evacuation route direction may vibrate under control of the control unit 30 to intuitively perform evacuation guidance for a user. Further, all of the vibration units 36 may vibrate as a warning in a case in which the user is moving toward a dangerous zone.

(Microphone 37)

The microphone 37 has a voice collection function, and specifically, is realized by, for example, a bone conduction microphone. Further, a plurality of microphones 37 may be provided in the HHMD 3.

(Storage Unit 38)

The storage unit 38 stores, for example, a program for executing each of the processes in the control unit 30. Further, the storage unit 38 may store an evacuation guidance instruction signal received from the evacuation guidance server 1, may store position information of the HHMD 3 detected by the current position measurement unit 32, or may store information detected by various sensors (the biosensor 33 and the environment information sensor 34).

The specific configuration of the HHMD 3 according to this embodiment has been described above. The configuration of the HHMD 3 shown in FIG. 10 is an example, and this embodiment is not limited thereto. For example, the HHMD 3 may intuitively perform evacuation guidance for a user using an output unit other than a speaker or a vibration unit.

3. OPERATION PROCESS

Figure 11:
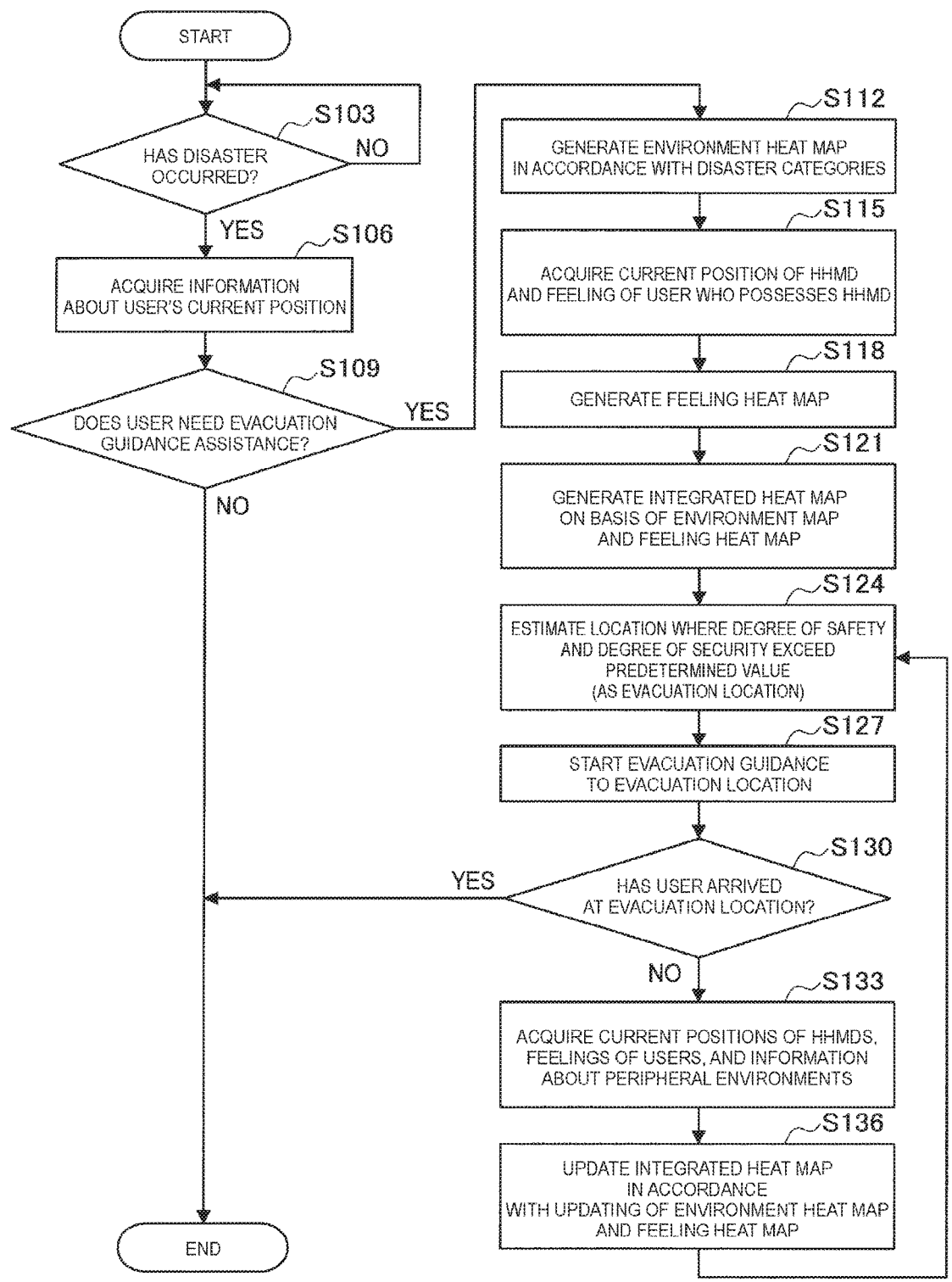
FIG. 11 is a flowchart showing an evacuation guidance process of the navigation system according to the embodiment.

Subsequently, a navigation operation process according to this embodiment will be described with reference to FIG. 11. FIG. 11 is a flowchart showing a navigation evacuation guidance process according to this embodiment.

As shown in FIG. 11, first, in step S103, the evacuation guidance server 1 determines whether a disaster has occurred. This operation process uses the occurrence of the disaster as, for example, a trigger of the navigation process. A disaster occurrence notification may be sent from, for example, a predetermined disaster notification server.

Then, in a case in which the disaster has occurred ("Yes" in S103), in step S106, the HHMD position acquisition unit 10a of the evacuation guidance server 1 acquires information about a user's current position (that is, current position information of the HHMD 3).

Then, in step S109, the control unit 10 of the evacuation guidance server 1 determines whether the user needs evacuation guidance assistance according to the user's current position. For example, in a case in which the user's current position is a location far away from a disaster location, the evacuation guidance assistance is not particularly necessary.

Then, in a case in which the evacuation guidance assistance is necessary ("Yes" in S109), in step S112, the environment heat map generation unit 10d generates (or acquires an environment heat map which has already been generated) the environment heat map 41 indicating a distribution of the degrees of security or the degrees of danger according to a category of the disaster that has occurred.

Then, in step S115, the HHMD position acquisition unit 10a acquires the current position of the HHMD 3, and the user feeling acquisition unit 10b acquires a feeling of a user who possesses the HHMD 3.

Then, in step S118, the feeling heat map generation unit 10c generates the feeling heat map 42 indicating a distribution of the degrees of security or the degrees of anxiety of each person associated with a location on the basis of the acquired current position of the HHMD 3 and the acquired user feeling information.

Subsequently, in step S121, the safe and secure location estimation unit 10e generates the integrated heat map 43 on the basis of the environment heat map 41 and the feeling heat map 42.

Then, in step S124, the safe and secure location estimation unit 10e estimates a location where the degree of safety and the degree of security exceeds a predetermined value as a safe and secure evacuation location on the basis of the integrated heat map 43.

Then, in step S127, guidance for guiding the user to the evacuation location is generated by the evacuation information generation unit 10f, and evacuation guidance of the user to the evacuation location is started by the evacuation guidance unit 10g. Specifically, the evacuation guidance unit 10g transmits an evacuation guidance signal to the HHMD 3 and performs evacuation guidance for the user using the HHMD 3.

Then, in step S130, the control unit 10 of the evacuation guidance server 1 determines whether the user has arrived at the evacuation location according to the evacuation guidance on the basis of the user's position information which is continuously acquired by the HHMD position acquisition unit 10a.

Then, in a case in which the user has not yet arrived at the evacuation location ("No" in S130), in step S133, the evacuation guidance server 1 acquires current positions of multiple HHMDs 3, information about feelings of users who possess the HHMDs 3, and information about peripheral environments of the HHMDs 3 from the HHMDs 3 in real time.

Further, in step S136, in the evacuation guidance server 1, updating of the feeling heat map is performed on the basis of the newly acquired feelings of the users, updating of the environment heat map is performed on the basis of the environment information, and also, updating of the integrated heat map is performed according to the updated feeling heat map and environment heat map.

Then, the procedure returns to step S124, and evacuation guidance is performed on the basis of the latest integrated heat map.

The evacuation guidance process of the navigation system according to this embodiment has been described above.

4. APPLICATION EXAMPLES

<4-1. First Application Example>

In the above-described navigation, guidance specific to an evacuation guidance process has been mainly described, but this embodiment is not limited thereto. For example, the HHMD 3 may ordinarily perform sightseeing navigation, and may be switched to disaster navigation when a disaster occurs.

Figure 12:
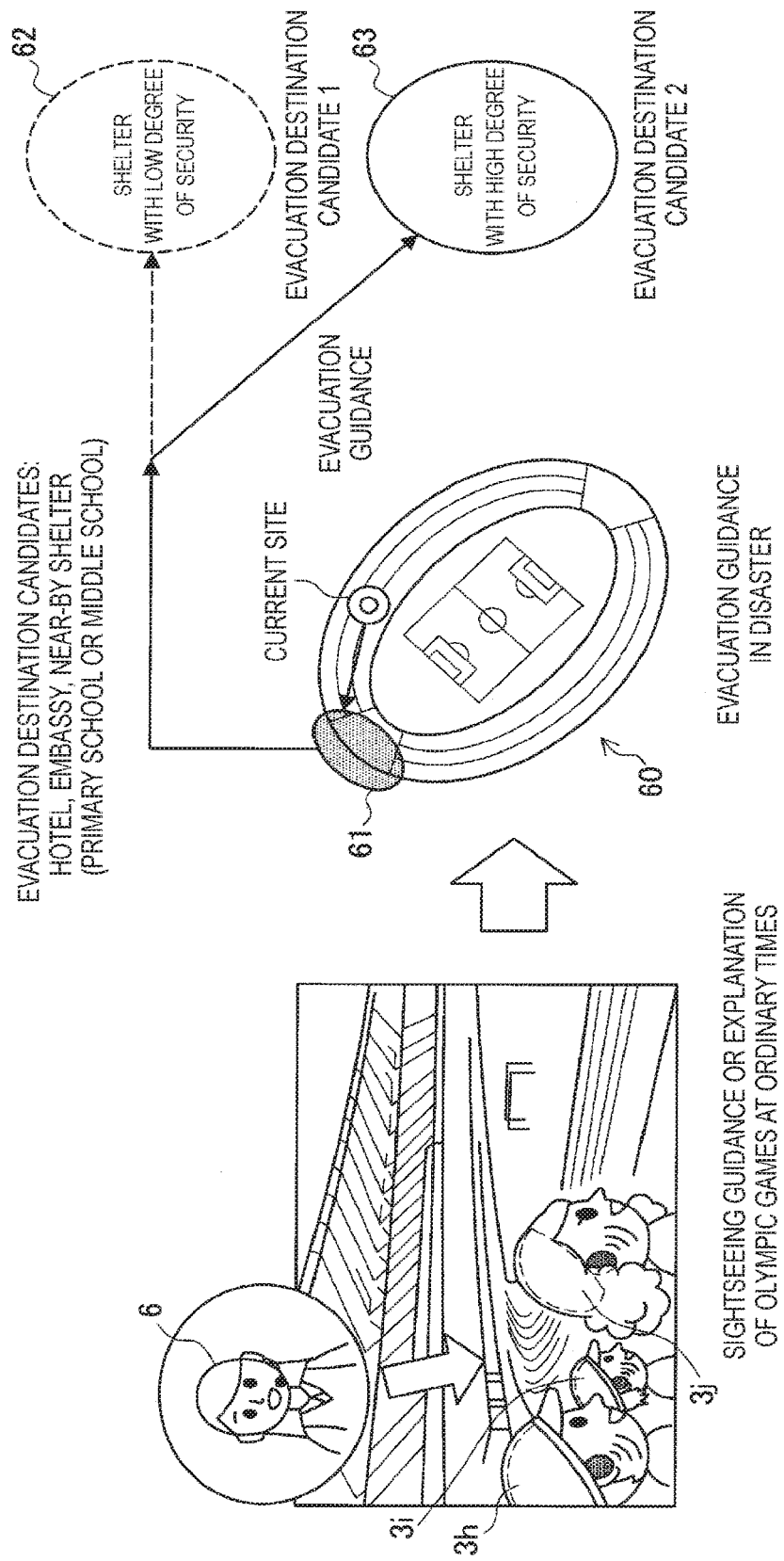
FIG. 12 is a diagram illustrating an application example of the navigation system according to the embodiment.

FIG. 12 is a diagram illustrating an application example of the navigation system according to this embodiment. For example, it is assumed that a large number of visitors come from overseas for an event held over a period of time, such as the Olympics or an international forum. It is possible to safely evacuate tourists from overseas even in an unfamiliar land by causing the visitors from overseas to wear the HHMDs 3 according to this embodiment at an airport or an accommodation facility and by ordinarily operating as sightseeing navigator and operating as a disaster navigator when a disaster occurs.

The HHMD 3 is not mounted only on the above-described disaster prevention helmet, but may also be mounted on a hat or a wig. With this configuration, as shown on the left side of FIG. 12, tourists who wear HHMDs 3h, 3i, and 3j on a daily basis can enjoy navigation services for watching of the Olympic Games, for example. For example, in a situation in which users watch a sports game in a stadium, voice guidance information in the users' mother tongues is reproduced from speakers of the HHMDs 3h, 3i, and 3j.

Further, in a case in which a large-scale disaster such as an earthquake or a volcanic eruption occurs, the HHMDs 3h, 3i, and 3j are switched to disaster navigation, and evacuation guidance in the users' mother tongues may be performed. The evacuation guidance process performed herein is as shown in FIG. 11.

For example, in a case in which a large-scale disaster occurs while a sports game is being watched in a stadium, the navigation system according to this embodiment first guides, on the basis of current positions of users who wear the HHMDs 3, the users to an emergency exit in the stadium, and then starts evacuation guidance to a hotel, an embassy, and a nearby shelter (a school or the like) which are registered as evacuation destination candidates. Here, the navigation system refers to the degrees of security of an evacuation destination candidate 1 and an evacuation destination candidate 2 on the basis of the feeling heat map 42. In a case in which the degree of security of the evacuation destination candidate 2 is higher than that of the evacuation destination candidate 1, the users are guided to the evacuation destination candidate 2.

In this way, the HHMD 3 may be mounted on a hat or a wig, and may be ordinarily used as a sightseeing navigator. Further, the navigation system according to this embodiment is able to guide a user to a secure location only on the basis of the feeling heat map 42.

<4-2. Second Application Example>

As an application example in a case in which a user is guided to a secure location only on the basis of the feeling heat map 42, for example, in an event site or a sightseeing resort, navigation for guiding a user to a vacant location from a crowded location may be considered. That is, this is because a crowded location is considered to be a location with a high degree of anxiety and a vacant location is considered to be a location with a high degree of security in such a sightseeing resort. Even in this case, if the HHMD 3 is mounted on a hat or a wig, the HHMD 3 may be ordinarily used as a sightseeing navigator and is able to guide a user to a location with a high degree of security as necessary.

5. CONCLUSION

As described above, in the navigation system according to the embodiment of the present disclosure, it is possible to guide a user to a location with a high degree of security on the basis of feeling information of people associated with locations.

The preferred embodiment(s) of the present disclosure has/have been described above with reference to the accompanying drawings, whilst the present disclosure is not limited to the above examples. A person skilled in the art may find various alterations and modifications within the scope of the appended claims, and it should be understood that they will naturally come under the technical scope of the present disclosure.

For example, a computer program for causing hardware such as a CPU, a ROM, and a RAM provided in the above-described evacuation guidance server 1, the sensitivity server 2, or the HHMD 3 to execute functions of the excavation guidance server 1, the sensitivity server 2, or the HHMD 3 may also be created. Further, a computer-readable recording medium on which the computer program is stored is also provided.

Further, a configuration in which facial expression information of a user of the HHMD 3 is recognized on the basis of an image captured by a camera provided in the HHMD 3 has been described, but this embodiment is not limited thereto, and the facial expression information may be recognized on the basis of an image captured by a camera which is provided on the periphery.

Further, at least one of each of the functions of the control unit 10 of the evacuation guidance server 1 shown in FIG. 3 may be provided in the HHMD 3.

Further, the evacuation guidance server 1 according to this embodiment may notify a user of a temporal change of the degree of security as shown in FIG. 6 or 7 or an integrated heat map as shown in FIG. 8, and then, may perform evacuation guidance.

Further, the effects described in this specification are merely illustrative or exemplified effects, and are not limitative. That is, with or in the place of the above effects, the technology according to the present disclosure may achieve other effects that are clear to those skilled in the art from the description of this specification.

Additionally, the present technology may also be configured as below.

(1)

A navigation system including:

an acquisition unit that acquires position information indicating a position of a client terminal device and information related to a feeling of a user of the client terminal device;

a generation unit that generates a degree of security of the position indicated by the position information on a basis of the position information and the information related to the feeling of the user, to generate a feeling map;

an estimation unit that estimates a location with a high degree of security on a basis of the feeling map;

a guidance generation unit that generates guidance for guiding the user of the client terminal device to the location with the high degree of security; and a provision unit that provides the guidance to the user of the client terminal device.

(2)

The navigation system according to (1), wherein, as the information related to the feeling of the user, the acquisition unit acquires biological information of the user, which is detected by the client terminal device.

(3)

The navigation system according to (1) or (2), wherein, as the information related to the feeling of the user, the acquisition unit acquires post content posted on social media by the user of the client terminal device.

(4)

The navigation system according to any one of (1) to (3), wherein the acquisition unit acquires a facial expression of the user of the client terminal device as the information related to the feeling of the user.

(5)

The navigation system according to any one of (1) to (4), wherein, as the information related to the feeling of the user, the acquisition unit acquires a sensitivity value corresponding to the user registered as an object, from a sensitivity value database formed by accumulating sensitivity values of respective objects generated on a basis of information related to interactions between the objects.

(6)

The navigation system according to any one of (1) to (5), further including:

an environment map generation unit that generates an environment map indicating a distribution of degrees of safety, wherein the estimation unit estimates a location with a high degree of security and a high degree of safety in accordance with the feeling map and the environment map.

(7)

The navigation system according to (6), wherein the environment map generation unit generates an environment map having different distributions of the degrees of safety in accordance with types of disasters, and the estimation unit estimates the location with a high degree of security and a high degree of safety in accordance with the feeling map and the environment map.

(8)

The navigation system according to any one of (1) to (7), wherein the provision unit guides the user to a guidance direction by voice output in the client terminal device.

(9)

A client terminal device including:

a position information detection unit that detects a position of the client terminal device and generates position information indicating the position;

a detection unit that detects information related to a feeling of a user of the client terminal device;

a transmission unit that transmits the position information and the information related to the feeling of the user to an external device;

an acquisition unit that acquires a feeling map which is generated by the external device on a basis of the position information and the information related to the feeling of the user, and which indicates a degree of security of the position indicated by the position information; and an output unit that outputs, to the user of the client terminal device, guidance for guiding the user of the client terminal device to a location estimated to have a high degree of security on a basis of the feeling map.

(10)

The client terminal device according to (9), wherein the detection unit detects biological information of the user of the client terminal device as the information related to the feeling of the user.

(11)

The client terminal device according to (9) or (10), wherein, as the information related to the feeling of the user, the detection unit detects post content posted on social media by the user of the client terminal contributes.

(12)

The client terminal device according to any one of (9) to (11), wherein the detection unit detects a facial expression of the user of the client terminal device as the information related to the feeling of the user.

(13)

The client terminal device according to any one of (9) to (12), wherein the detection unit detects information related to an interaction between the user of the client terminal device and an object, as the information related to the feelings of the user.

(14)

The client terminal device according to any one of (9) to (13), wherein the acquisition unit acquires an environment map indicating a distribution of degrees of safety, and the output unit outputs, to the user of the client terminal device, guidance for guiding the user of the client terminal device to a location estimated to have a high degree of security and a high degree of safety on a basis of the feeling map and the environment map.

(15)

The client terminal device according to any one of (9) to (14), wherein the acquisition unit acquires an environment map having different distributions of degrees of safety in accordance with types of disasters, and the output unit outputs, to the user of the client terminal device, guidance for guiding the user of the client terminal device to a location estimated to have a high degree of security and a high degree of safety on a basis of the feeling map and the environment map.

(16)

The client terminal device according to any one of (9) to (15), wherein the output unit provides the guidance for guiding the user by voice output or vibration.

(17)

A control method including:
acquiring position information indicating a position of a client terminal device and information related to a feeling of a user of the client terminal device;
generating a degree of security of the position indicated by the position information on a basis of the position information and the information related to the feeling of the user, to generate a feeling map;
estimating a location with a high degree of security on a basis of the feeling map;
generating guidance for guiding the user of the client terminal device to the location with a high degree of security; and
providing the guidance to the user of the client terminal device.

(18)

A storage medium that stores a program for causing a computer to function as:
a position information detection unit that detects a position of a client terminal device and generates position information indicating the position;
a detection unit that detects information related to a feeling of a user of the client terminal device;
a transmission unit that transmits the position information and the information related to the feeling of the user to an external device;
an acquisition unit that acquires a feeling map which is generated by the external device on a basis of the position information and the information related to the feeling of the user, and which indicates a degree of security of the position indicated by the position information; and
an output unit that outputs, to the user of the client terminal device, guidance for guiding the user of the client terminal device to a location estimated to have a high degree of security on a basis of the feeling map.

REFERENCE SIGNS LIST 1 evacuation guidance server
10 control unit
10a HHMD position acquisition unit
10b user feeling acquisition unit
10c feeling heat map generation unit
10d environment heat map generation unit
10e safe and secure location estimation unit
10f evacuation information generation unit
10g evacuation guidance unit
12 storage unit
2 sensitivity server
3 HHMD

The invention claimed is:

1. A navigation system comprising:
an acquisition unit that acquires position information indicating a position of a client terminal device and information related to a feeling of a user of the client terminal device;
a generation unit that generates a degree of security of the position indicated by the position information on a basis of the position information and the information related to the feeling of the user, to generate a feeling map indicating a degree of security of the position indicated by the position information;
an environment map generation unit that generates an environment map indicating a distribution of degrees of safety,
an estimation unit that (i) generates an integrated map from the feeling map and the environment map, and (ii) estimates a location with a high degree of security and a high degree of safety in accordance with the integrated map;
a guidance generation unit that generates guidance for guiding the user of the client terminal device to the location with the high degree of security; and
a provision unit that provides the guidance to the user of the client terminal device.

2. The navigation system according to claim 1, wherein, as the information related to the feeling of the user, the acquisition unit acquires biological information of the user, which is detected by the client terminal device.

3. The navigation system according to claim 1, wherein, as the information related to the feeling of the user, the acquisition unit acquires post content posted on social media by the user of the client terminal device.

4. The navigation system according to claim 1, wherein the acquisition unit acquires a facial expression of the user of the client terminal device as the information related to the feeling of the user.

5. The navigation system according to claim 1, wherein, as the information related to the feeling of the user, the acquisition unit acquires a sensitivity value corresponding to the user registered as an object, from a sensitivity value database formed by accumulating sensitivity values of respective objects generated on a basis of information related to interactions between the objects.

6. The navigation system according to claim 1,
wherein the environment map generation unit generates an environment map having different distributions of the degrees of safety in accordance with types of disasters, and
the estimation unit estimates the location with a high degree of security and a high degree of safety in accordance with the integrated map.

7. The navigation system according to claim 1,
wherein the provision unit guides the user to a guidance direction by voice output in the client terminal device.

8. The navigation system according to claim 1, wherein the client terminal device is a head wearable device.

9. The navigation system according to claim 1, wherein the provision unit provides, as guidance to the estimated location, an audio guidance signal or vibration guidance signal.

10. A client terminal device comprising:
a position information detection unit that detects a position of the client terminal device and generates position information indicating the position;
a detection unit that detects information related to a feeling of a user of the client terminal device;
a communication interface that transmits the position information and the information related to the feeling of the user to an external device;
an acquisition unit that acquires (i) a feeling map which is generated by the external device on a basis of the position information and the information related to the feeling of the user, and which indicates a degree of security of the position indicated by the position information, acquires (ii) an environment map indicating a distribution of degrees of safety, and acquires (iii) an integrated map that is generated from both the feeling map and
the environment map; and
an output unit that outputs, to the user of the client terminal device, guidance for guiding the user of the client terminal device to a location estimated to have a high degree of security and a high degree of safety based on the integrated map.

11. The client terminal device according to claim 10,
wherein the detection unit detects biological information of the user of the client terminal device as the information related to the feeling of the user.

12. The client terminal device according to claim 10,
wherein, as the information related to the feeling of the user, the detection unit detects post content posted on social media by the user of the client terminal contributes.

13. The client terminal device according to claim 10,
wherein the detection unit detects a facial expression of the user of the client terminal device as the information related to the feeling of the user.

14. The client terminal device according to claim 10,
wherein the detection unit detects information related to an interaction between the user of the client terminal device and an object, as the information related to the feelings of the user.

15. The client terminal device according to claim 10,
wherein the environment map includes different distributions of degrees of safety in accordance with types of disasters, and
the output unit outputs, to the user of the client terminal device, guidance for guiding the user of the client terminal device to a location estimated to have a high degree of security and a high degree of safety based on the integrated map.

16. The client terminal device according to claim 10,
wherein the output unit provides the guidance for guiding the user by voice output or vibration.

17. A control method comprising:
acquiring position information indicating a position of a client terminal device and information related to a feeling of a user of the client terminal device;
generating a feeling map on a basis of the position information and the information related to the feeling of the user, the feeling map indicating a degree of security of the position indicated by the position information;
generating an environment map indicating a distribution of degrees of safety;
generating an integrated map from the feeling map and the environment map;
estimating a location with a high degree of security and a high degree of safety on a basis of the integrated map;
generating guidance for guiding the user of the client terminal device to the location with a high degree of security; and
providing the guidance to the user of the client terminal device.

18. A non-transitory computer readable medium having instructions stored therein, which when executed by a processor in a client terminal device causes the processor to execute a method comprising:
detecting a position of the client terminal device and generates position information indicating the position;
detecting information related to a feeling of a user of the client terminal device;
transmitting the position information and the information related to the feeling of the user to an external device;
acquiring a feeling map which is generated by the external device on a basis of the position information and the information related to the feeling of the user, and which indicates a degree of security of the position indicated by the position information;
acquiring an environment map indicating a distribution of degrees of safety;
acquiring an integrated map that is generated from both the feeling map and the environment map; and
outputting, to the user of the client terminal device, guidance for guiding the user of the client terminal device to a location estimated to have a high degree of security and a high degree of safety based on the integrated map.

* * * * *